UNITED STATES PATENT OFFICE.

RUDOLF UHLENHUTH, OF HÖCHST-ON-THE-MAIN, GERMANY, ASSIGNOR TO FARB-WERKE VORM. MEISTER LUCIUS & BRUNING, OF HÖCHST-ON-THE-MAIN, GERMANY, A CORPORATION OF GERMANY.

BROWN ANTHRAQUINONE DYE AND PROCESS OF MAKING SAME.

943,717.      Specification of Letters Patent.      Patented Dec. 21, 1909.

No Drawing.      Application filed March 24, 1909. Serial No. 485,516.

*To all whom it may concern:*

Be it known that I, RUDOLF UHLENHUTH, Ph. D., chemist, a citizen of the Empire of Germany, residing at Höchst-on-the-Main, Germany, have invented certain new and useful Improvements in the Manufacture of New Brown Anthraquinone Dyestuffs, of which the following is a specification.

My invention relates to the manufacture of new anthraquinone derivatives dyeing in the vat, by melting with alkalies the dianthraquinonyl.1.4-diamidoanthraquinones of the general formula:

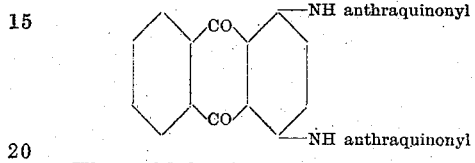

The said bodies can be obtained for instance by treating 1.4-diamidoanthraquinone or leuco-1.4-diamidoanthraquinone with halogenanthraquinones.

The new dyestuffs are, when dry, dark powders, which are insoluble in water, in alkalies and diluted acids, and very little soluble in the usual organic solvents. They dissolve in the hydrosulfites in presence of alkali, yielding then solutions which dye cotton brown shades very fast to the light and resisting very well chlorin and alkalies.

In order to produce the said new dyestuffs I can proceed for instance as follows: Ten parts by weight of di-alpha-alpha-anthraquinonyl.1.4-diamidoanthraquinone, obtainable for instance from 1.4-diamidoanthraquinone and alpha-chloroanthraquinone, are introduced at about 180° centigrade into 100 parts of fused caustic potash and then the temperature is raised to 210° centigrade. The reaction product finally separates out on the surface of the melt and becomes solid. It is poured into water and filtered. In this way the dyestuff is obtained in the form of a black powder of the above mentioned properties. It dissolves to a brown solution in concentrated sulfuric acid and is precipitated from this solution in brown flakes by adding water. It dyes cotton in the hydrosulfite vat Havana-brown shades.

Having now described my invention and in what manner the same is to be performed, what I claim as new, and desire to secure by Letters-Patent, is:

1. The process for producing new anthraquinone dyestuffs, which consists in melting with alkalies the dianthraquinonyl.1.4-diamidoanthraquinones of the general formula:

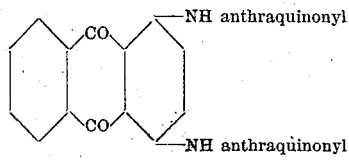

and then isolating the resulting dyestuff from the reaction mixture, substantially as hereinbefore described.

2. The process for producing a new anthraquinone dyestuff which consists in melting with alkalies di-alpha-alpha-anthraquinonyl.1.4-diamidoanthraquinone and then isolating the resulting dyestuff from the reaction mixture, substantially as hereinbefore described.

3. As new products, the herein described new dyestuffs, obtainable by melting dianthraquinonyl.1.4 - diamidoanthraquinones with alkalies, which dyestuffs, when dry, are dark powders insoluble in water, in alkalies and in diluted acids, and very little soluble in the usual organic solvents, dyeing cotton from the vat fast brown shades, substantially as hereinbefore described.

4. As a new product, the herein described new dyestuff, obtainable by melting di-alpha - alpha - anthraquinonyl.1.4-diamidoanthraquinone with alkalies, which dyestuff, when dry, is a dark powder, being insoluble in water, in alkalies and diluted acids, and very little soluble in the usual organic solvents; being dissolved by concentrated sulfuric acid (of 66° Bé.) yielding a brown solution from which the dyestuff separates out in brown flakes on the addition of water, dyeing cotton in the hydrosulfite vat Havana-brown shades which are very fast to the light and resist very well chlorin and alkalies, substantially as hereinbefore described.

In testimony whereof, I affix my signature in presence of two witnesses.

RUDOLF UHLENHUTH.

Witnesses:
JEAN GRUND,
CARL GRUND.